United States Patent [19]
Skarpelos et al.

[11] Patent Number: 5,764,879
[45] Date of Patent: Jun. 9, 1998

[54] MULTI-VOLUME AUDIT TRAILS FOR FAULT TOLERANT COMPUTERS

[75] Inventors: Michael J. Skarpelos, San Jose; Robert van der Linden, Scotts Valley; William J. Carley; James A. Lyon, both of San Jose, all of Calif.; Matthew C. McCline, Bellevue, Wash.

[73] Assignee: Tandem Computers, Inc., Cupertino, Calif.

[21] Appl. No.: 688,629

[22] Filed: Jul. 29, 1996

Related U.S. Application Data

[63] Continuation of Ser. No. 377,075, Jan. 23, 1995, Pat. No. 5,590,274.

[51] Int. Cl.$^6$ .................................................. G06F 11/34
[52] U.S. Cl. ........................................................ 395/182.05
[58] Field of Search ........................... 395/182.11, 182.04, 395/182.05, 600

[56] References Cited

U.S. PATENT DOCUMENTS

| | | | |
|---|---|---|---|
| 4,020,466 | 4/1977 | Cordi et al. | 340/172.5 |
| 4,084,231 | 4/1978 | Capozzi et al. | 364/200 |
| 5,089,958 | 2/1992 | Horton et al. | 395/575 |
| 5,325,519 | 6/1994 | Long et al. | 395/575 |

OTHER PUBLICATIONS

Bernstein, P., et al., Concurrency Control and Recovery in Database Systems, Addison–Wesley, 1987, pp. 174–180.
Gray, J., "Notes on Database Operating Systems," Operating Systems—An Advanced Course, Springer–Verlag, 1978, pp. 459–480.
Audit Trail Compaction for Database Recovery, John Kaunitz and Louis Van Ekert, Jul. 1984, vol. 27, No. 7.
Gray, J., et al. "Transaction Processing: Concepts and Techniques," Morgan Kauffman, 1993, pp. 516–517.

*Primary Examiner*—Phung M. Chung
*Attorney, Agent, or Firm*—Townsend and Townsend and Crew LLP

[57] ABSTRACT

A fault tolerant computer system distributes audit trail files containing audit records, across an arbitrary number of disk volumes. After one audit trail file becomes full, audit records are directed toward a next audit trail file stored on a different disk volume. Storage of newly generated audit rotates through the disk volumes in roundrobin fashion. Full audit trail files are eventually archived and their space becomes available again for renaming and storage of newly generated audit records. The number of audit records available for on-line recovery after a failure is not limited to the storage capacity of any single disk volume. Furthermore, there is no contention for disk access between archiving of full audit trail files and storage of newly generated audit records.

6 Claims, 8 Drawing Sheets

MULTI-VOLUME AUDIT TRAILS FOR FAULT TOLERANT COMPUTERS

This is a Continuation of application No. 08/377,075 U.S. Pat. No. 5,590,274 filed Jan. 23, 1995.

BACKGROUND OF THE INVENTION

The invention relates to fault tolerant computer systems and more particularly to techniques for recording changes to a database so as to allow consistent recovery of the database in the event of a failure.

Fundamental to the design of fault tolerant computer systems is a programmatic construct called a transaction. A transaction is an explicitly delimited operation, or set of related operations, that changes the content of a database from one consistent state to another.

The database operations within a transaction are treated as a single unit. Either all of the changes performed by the transaction are made permanent (the transaction is committed) or none of the changes are made permanent (the transaction is aborted). If a failure occurs during the execution of a transaction, whatever partial changes were made to the database are undone automatically, thus leaving the database in a consistent state.

Before a transaction permanently commits its changes to the database, information about the database rows or records affected by the transaction is written to a so-called audit trail. At a conceptual level, one can view an audit trail as a history of changes to a database. An audit trail consists of a series of files whose records describe changes to the database. An audit trail record typically consists of a before and after image of a modified database record (or physical page). With before images, the database system can undo incomplete modifications which occur when an application program aborts or fails to complete due to a system failure. With after images, the database system can recover from media failures by restoring old (possibly inconsistent) copies of database files and redoing the earlier modifications. Other terms for audit trails containing this information include audit logs, or journals.

Typically, the series of files constituting an audit trail are physically stored on a single disk volume. As successive audit trail files on the disk volume become full, an archiving process migrates them to tape and the files become available for storing newly generated records.

This approach to the physical storage of audit trail files carries many disadvantages. A process that is storing newly generated audit records must compete for disk access with the archiving of previously filled audit files. This contention can effectively limit the permissible rate of audit generation and ultimately the transaction processing speed.

Although the availability of tape for archiving old audit records removes any limit on the total amount of available storage, archived audit trail files are not available for on-line recovery. On-line recovery is limited to the audit records stored on the single disk volume.

One partial solution to the disk contention problem has been presented in J. Gray et al., *Transaction Processing Concepts and Techniques*, Morgan Kauffman, 1993, the contents of which are herein incorporated by reference. The Gray et al. technique, presented at section 9.6.4 of the cited reference, ameliorates the problem of disk contention. Unfortunately, on-line recovery is still limited to a single disk volume.

SUMMARY OF THE INVENTION

In accordance with the invention, a fault tolerant computer system distributes audit trail files containing audit records across an arbitrary number of disk volumes. After one audit trail file becomes full, audit records are directed toward a next audit trail file stored on a different disk volume. Storage of newly generated audit trail records rotates through the available disk volumes. The contents of full audit trail files are eventually archived and their space becomes available again for storage of newly generated audit records. The amount of audit available for on-line recovery after a failure is not limited to the storage capacity of any single disk volume. Furthermore, there is no contention for disk access between archiving of full audit trail files and storage of newly generated audit records.

In one embodiment of the invention, a fault tolerant computing system includes a plurality of processing units and disk storage units or volumes. At least one of the processing units executes a process that generates audit records that describes changes to a database or a system state. Some of the disk storage units are selected to receive audit records. Each so-designated disk storage unit has an associated primary audit trail disk process (ADP) running on one of the processing units that controls disk access and a backup audit trail disk process (ADP) running on another processing unit that takes over disk access in the event of a failure of the primary.

Another process running on one of the processing units is known as the audit trail configuration management process. This process controls the creation, renaming, and purging of audit trail files on the audit trail disk storage units. In response to system operator input, the audit trail configuration management process configures the number of disk storage units to be used for receiving audit and the number of audit trail files stored on each designated storage unit.

The audit generator directs its records to the primary audit trail storage process having access to a particular audit trail file known as the current audit trail file. This current primary audit trail storage process stores the records while monitoring growth of the current audit trail file. When the size of the current audit trail file reaches a threshold, the current audit trail storage process instructs the audit trail configuration management process to prepare a new audit trail file. The audit trail configuration management process prepares the new audit trail file and notifies the current audit trail storage process of the name of the new audit trail file.

When the current audit trail file becomes full, the current primary audit trail storage process sends the audit generator the name of the audit trail storage process having access to the new audit trail file. The current audit trail storage process also sends a rollover message to the new audit trail storage process. The invention provides a special rollover message protocol to insure that audit record storage is not disturbed by faults occurring during rollover.

The invention also permits disk volumes to be designated as overflow audit trail storage. The overflow space is used in extreme circumstances, such as when an operator is unavailable to mount tape for an audit dump or there is a sudden burst of audit generation that causes the primary audit trail to fill before the oldest file is eligible for rename. Audit trail records are transferred to the overflow volumes, thus freeing space for new audit generation. Also, the system operator can specify local disk volumes that will be used to hold audit trail files restored from an audit dump as part of a recovery procedure.

Various; audit trail configuration parameters such as the number of active audit trail disk volumes and the number of files per volume can be adjusted on-line. New audit generators can be added to an existing audit trail. A graphic user interface provides operators with a visual means of interpreting the ongoing status of the audit trail. One bar graph, for example, shows operators how much of the audit trail is currently in use. The system operator can tell at a glance if the present transaction workload is pushing the audit trail capacity toward the overflow threshold or, beyond that, toward the point where audit generation must be suspended.

The invention will be better understood by reference to the following detailed description in connection with the accompanying drawings.

DESCRIPTION OF SPECIFIC EMBODIMENTS

Definitions and Terms

The present discussion concerns the storage of audit records in a fault tolerant computer system wherein multiple processes run concurrently and exchange messages. The term "process" refers to a stream of activity defined by an ordered set of machine instructions defining the actions that the process is to take and the set of data values that it can read, write, and manipulate. Multiple processes may run concurrently and asynchronously within a fault tolerant computer system.

The term "message" refers to a unit of information transmitted from one process to another process. A message may be either "waited" or "no wait." A "waited message" is a message sent from one process to another process in which the sender does not proceed until it gets a reply. A "no-waited message" is a message sent from one process to another process in which the sender proceeds without waiting for a reply. The sender will accept a reply asynchronously.

Certain special types of process are relevant to the present invention. A "backup process" and a "primary process" form a "process pair", wherein the backup process takes over for the primary process if the primary process fails. Together, the process pair are viewed as a single logical entity. A primary process sends a backup process periodic "checkpoints" which are messages that include state information necessary to enable a takeover in the event of a failure.

A "disk process" is a process that manages a physical disk volume. A "data volume" or "data disk process" is a disk process that manages database files.

An "audit trail record" describes a change to a database or system state. An audit trail record may include an "after image" and a "before image" An "after image" is a copy of a database record or physical page after a change was made to it. A "before image" is a copy of a database record or physical page before a change was made to it. A "data volume" generates audit records associated with updates to database files.

An "audit trail file" is a file of audit trail records. An "audit trail" is an ordered sequence of audit trail files. An "audit trail disk process" (ADP) is a disk process that receives and writes records to audit trail files. An "audit generator" is any process that sends audit records to an ADP. Examples of audit generators include data disk processes and an audit trail configuration management process.

The present invention provides "multi-volume audit trails" which are audit trails in which consecutive files reside on different disk volumes managed by different ADPs. An audit generator sends currently generated audit to an ADP that manages a "current audit trail file" belonging to an audit trail assigned to the audit generator. In the context of the present invention, an "audit trail configuration management process" prepares the next current audit trail file in an audit trail's sequence of files. A "rollover" is a transition from using a current audit trail file which has become full to using the next audit trail file in the audit trail's sequence.

Detailed Discussion of One Embodiment of the Invention

Figure 1:
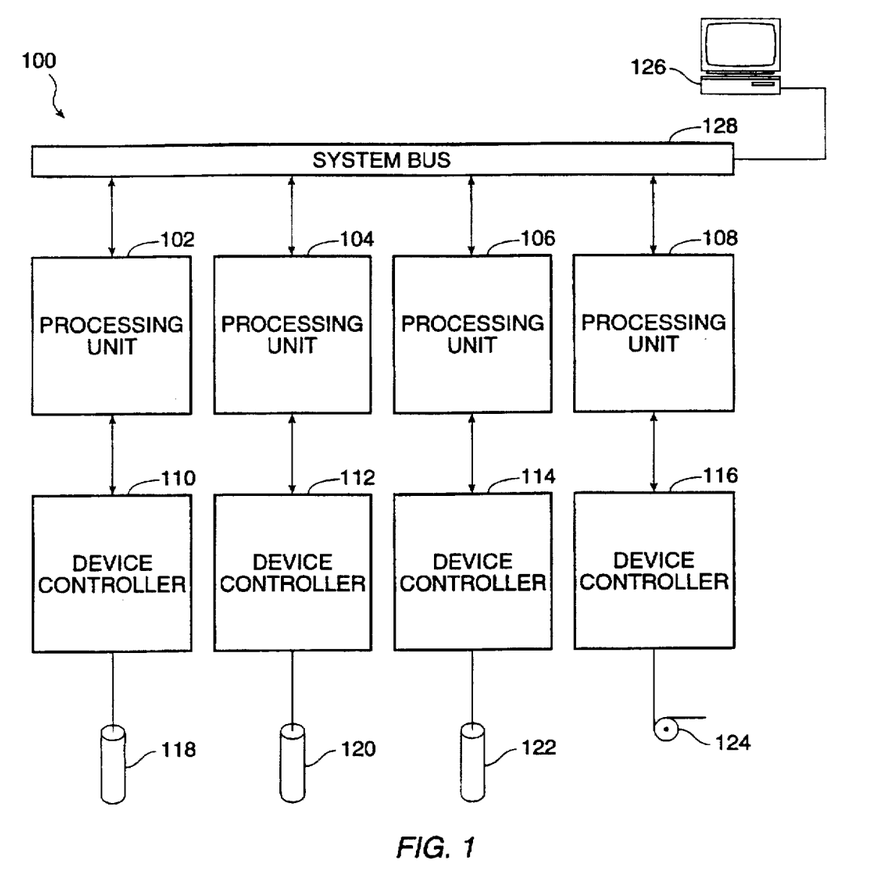
FIG. 1 depicts a fault tolerant computer system in accordance with the invention.

FIG. 1 depicts a fault tolerant computer system 100 in accordance with the invention. Fault tolerant computer system 100 includes multiple processing units 102, 104, 106, and 108, device controllers 110, 112, 114, 116, disk storage units or disk volumes 118, 120, 122 and tape storage unit 124. A system terminal 126 is also provided. A system bus 128 interconnects processing units 102, 104, 106, and 108 and system terminal 126. Device controller 110 provides system access to disk volume 118, device controller 112 provides access to disk volume 120, device controller 114 provides access to disk volume 122, and device controller 116 provides access to tape storage unit 124. The number, type, and arrangement of depicted hardware components are merely representative of elements that may be used to implement the present invention.

Figure 2:
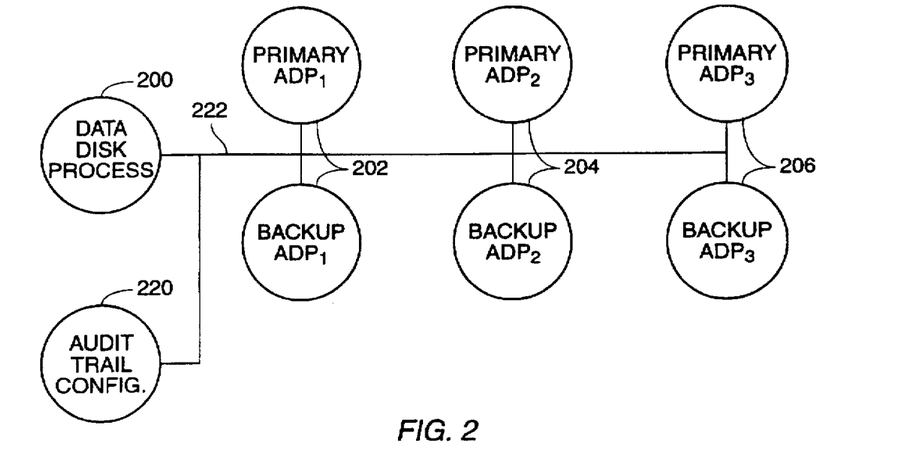
FIG. 2 is a process diagram depicting various processes that run on a fault tolerant computer system in accordance with the invention.

FIG. 2 is a process diagram depicting various processes that run on fault tolerant computer system 100 in accordance with the invention. A data disk process or data volume 200 is shown. Data disk process 200 operates to modify database records stored on one of the disk volumes and generates audit records. Data disk process 200 may actually represent a plurality of processes that modifies a disk volume. Audit trail disk process (ADP) pairs 202, 204, and 206 operate to store audit records on disk volumes that they manage. Each of ADP pairs 202, 204, and 206 include a primary process and a backup process. An audit trail configuration management process 220 is responsible for controlling the creation, renaming, and purging of audit trail files on the audit trail disk storage units. A backup audit trail configuration management process (not shown) is also provided to take over these functions in the event of a failure.

Any process that generates audit records for storage is herein referred to as an audit generator. Referring to FIG. 2, both data disk process 200 and audit trail configuration management process 220 generate audit records to permit recovery to a consistent state in the event of a failure. In accordance with the invention, each audit generator has an associated audit trail or ordered sequence of audit trail files for storing audit.

The primary and backup ADPs control access to disk volumes that store audit trail files. The primary ADP normally has control of disk accesses but in the event of failure, the backup takes over. To permit this takeover, the primary ADP sends periodic checkpoints to its backup including all the disk status information necessary for a smooth takeover.

The processes of FIG. 2 run on the processing units of FIG. 1. A single processing unit may run more than one process. A primary process and a backup process of a process pair run on different processing units.

The processes in FIG. 2 interact by exchanging messages via a messaging system 222. The operation of messaging system 222 is independent of whether intercommunicating processes operate on the same processing unit or different processing units. If necessary, message information is transmitted via system bus 128. FIG. 2 is intended to be illustrative and the invention may operate in the context of any combination of numbers of audit generating and audit storage processes.

Figure 3:
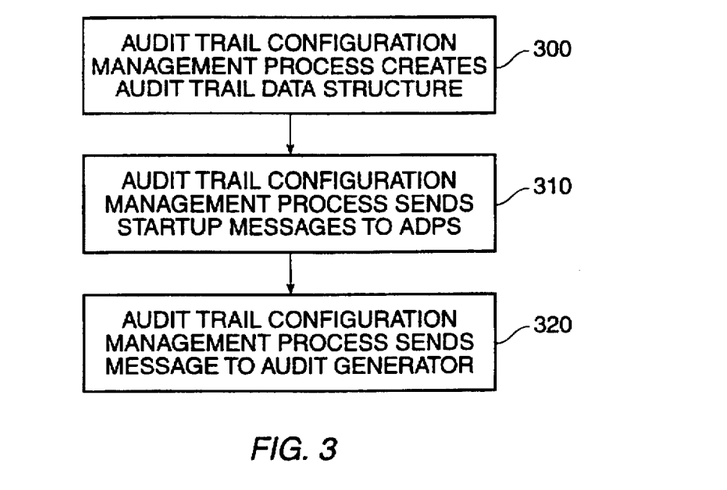
FIG. 3 is a flowchart describing steps of establishing a multi-volume audit trail in accordance with the invention.

FIG. 3 is a flowchart describing initial steps of establishing and operating an audit trail spread across multiple disk volumes in accordance with the invention. Audit trail configuration management process 220 creates an audit trail configuration data structure at step 300. This audit trail configuration data structure includes the identity of ADPs to be included in the audit trail, the number of audit trail files to be managed by each ADP, and the size of each file. In the preferred embodiment, an audit trail may be spread across up to 16 disk storage units. The maximum number of disk storage units in an audit trail is however arbitrary.

At step 310, audit trail configuration management process 220 sends startup messages to each of the ADPs in the audit trail. At this time, all the ADPs associated with the audit trail learn the name and a unique sequence number of the current audit trail file. At step 320, audit trail configuration management process 220 sends a message to an audit generator that will make use of the audit trail. The message includes the identity of the primary ADP having access to the current audit trail file, the current ADP.

Figure 4A:
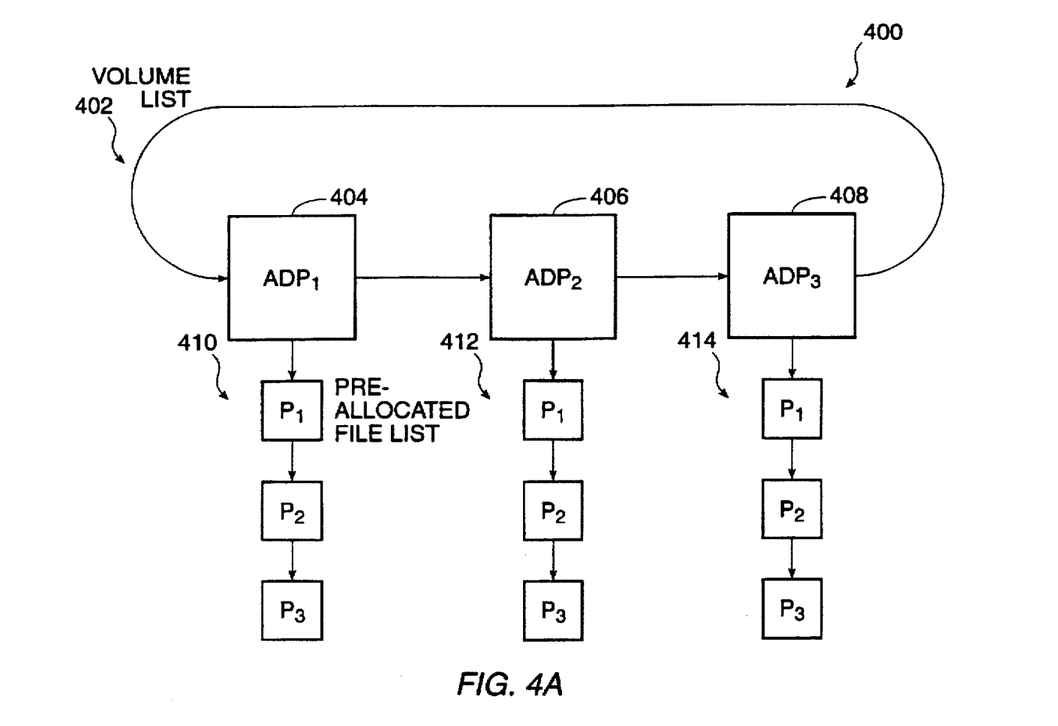
FIGS. 4A-4C illustrates an audit trail configuration data structure in accordance with the invention.

FIG. 4A depicts a portion of a representative audit trail configuration data structure 400 created at step 300 in accordance with the invention. Audit trail configuration data structure 400 includes an active volume linked list 402 including entries 404, 406, and 408 corresponding to the ADPs controlling the disk units selected by the operator for inclusion in the active audit trail. Each ADP entry has an associated linked list 410, 412, and 414 of entries $P_1$ through $P_3$ identifying preallocated audit trail files on the disk storage unit controlled by the ADP. Each ADP entry also has an associated linked list of resident active audit trail files but initially this list is empty.

Figure 4B:
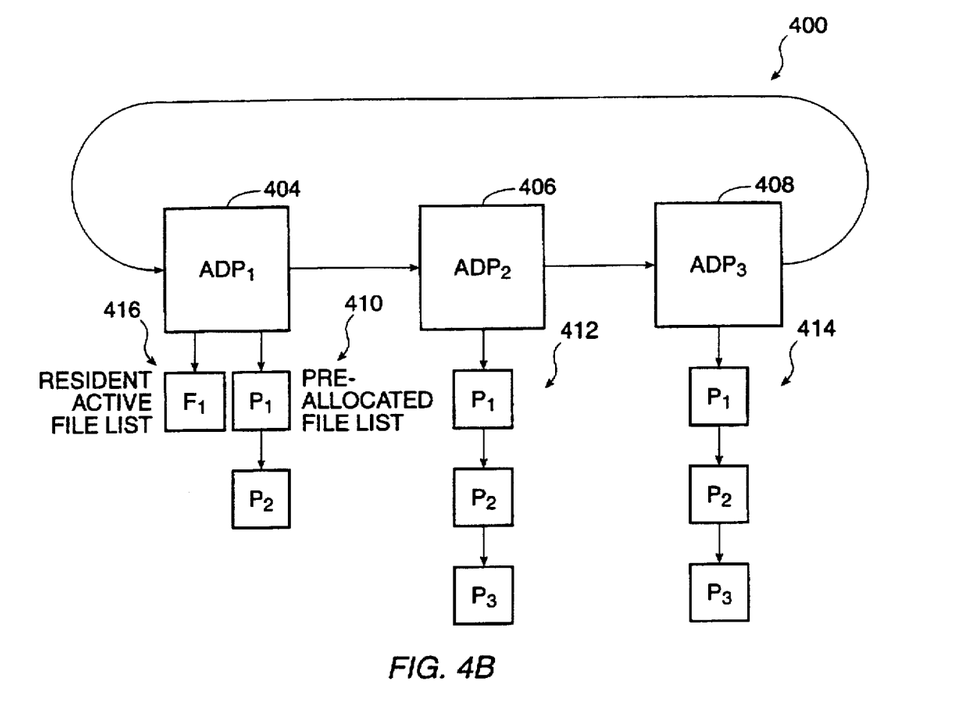

FIG. 4B depicts a portion of audit trail configuration data structure 400 after a first file has been selected to be the current audit trail file. The file identified by preallocated file entry $P_3$ has been renamed by the audit trail configuration management process 220 and is now identified by an entry $F_1$ in a new linked list 416 of resident active audit trail files associated with ADP entry 404. The file identified by entry $F_1$ is thus the first current audit trail file and $ADP_1$ is the first current ADP.

Newly generated audit is written to the current audit trail file via the current ADP. The current ADP monitors the growth of the current audit trail file. When the current audit trail file reaches a threshold, the current ADP requests audit trail configuration management process 220 to identify and prepare the next audit trail file.

The next audit trail file may either be a preallocated one that has not been used or an active audit trail file that is eligible, under predetermined criteria, for renaming. In the preferred embodiment, the following criteria are employed to determine eligibility for renaming. Typically, to be eligible, a candidate audit trail file must have been dumped to tape. (In the preferred embodiment, the operator may elect not to archive audit to tape in which case dumping is not required for eligibility.) The candidate file must not include audit required for 1) restarting fault tolerant computer system 200, 2) restoring data maintained in a cache of an audit generator, or 3) undoing a currently pending transaction. The current audit trail file also cannot be renamed. It is also possible in the preferred embodiment for other miscellaneous processes, e.g. a remote backup process, to deny eligibility to rename an audit trail file.

Figure 4C:
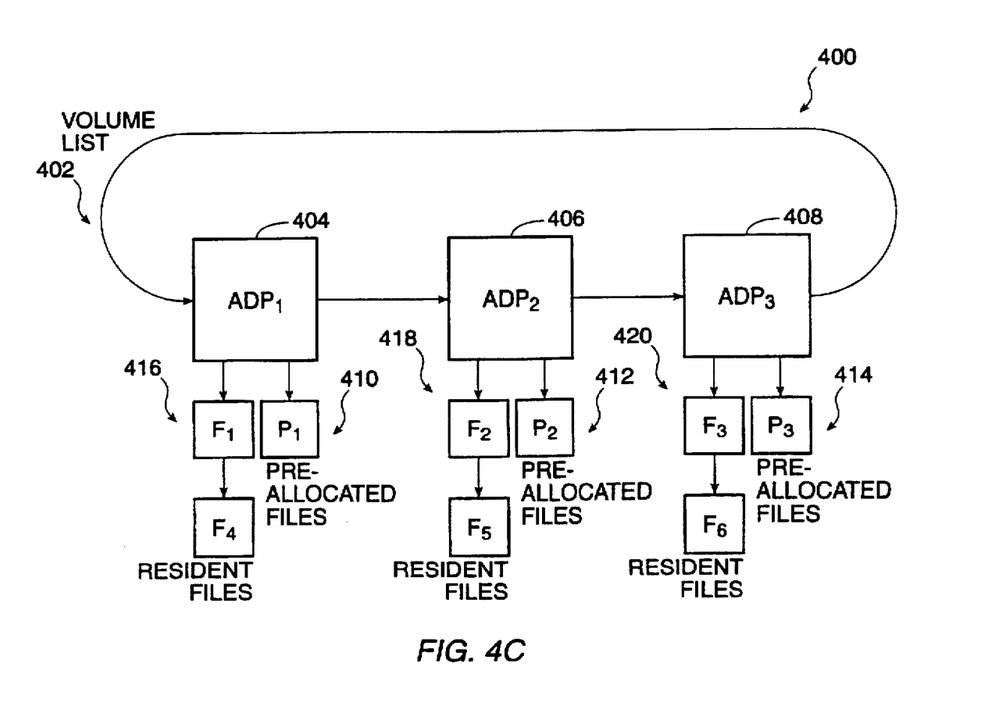

FIG. 4C depicts a portion of the audit trail configuration data structure 400 after several files have been filled with audit. Successive active audit trail files are identified by increasing sequence numbers and have associated entries marked $F_1, F_2, F_3, \ldots$ distributed through resident linked lists 416, 418, and 420 associated with each ADP entry.

Figure 5A:
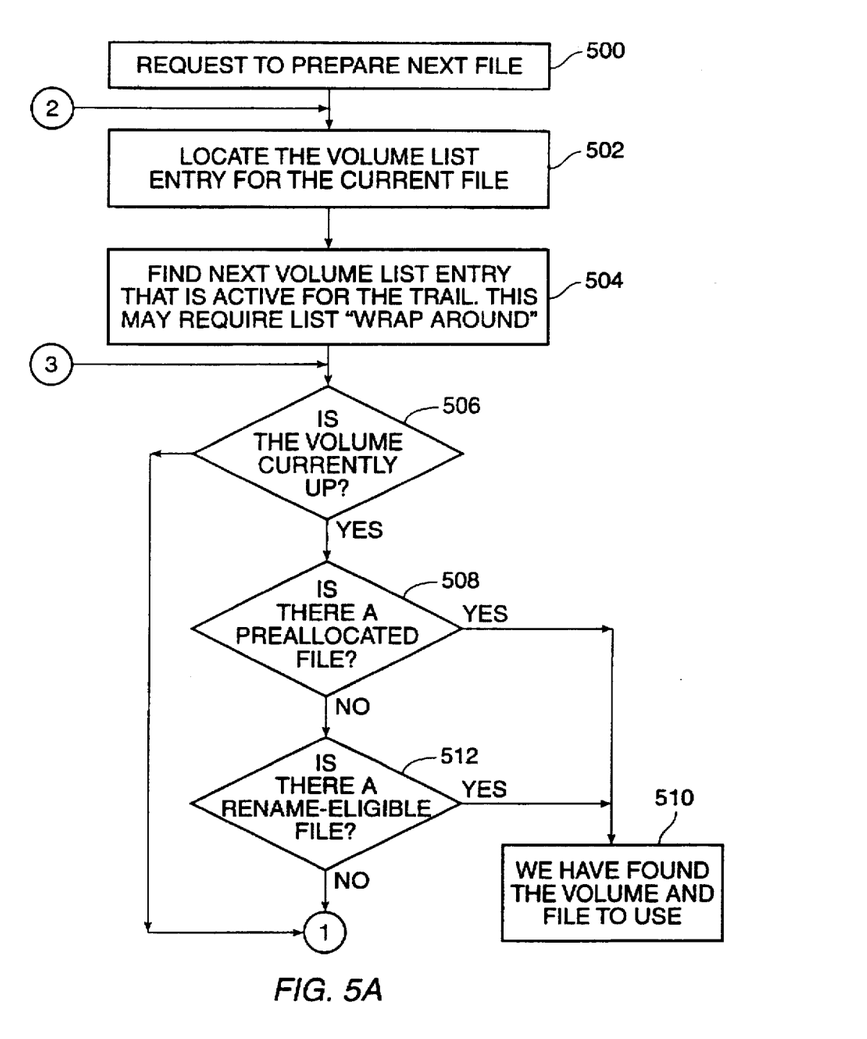
FIGS. 5A-5B depict a flowchart describing the steps of selecting a next current audit trail file in accordance with the invention.
Figure 5B:
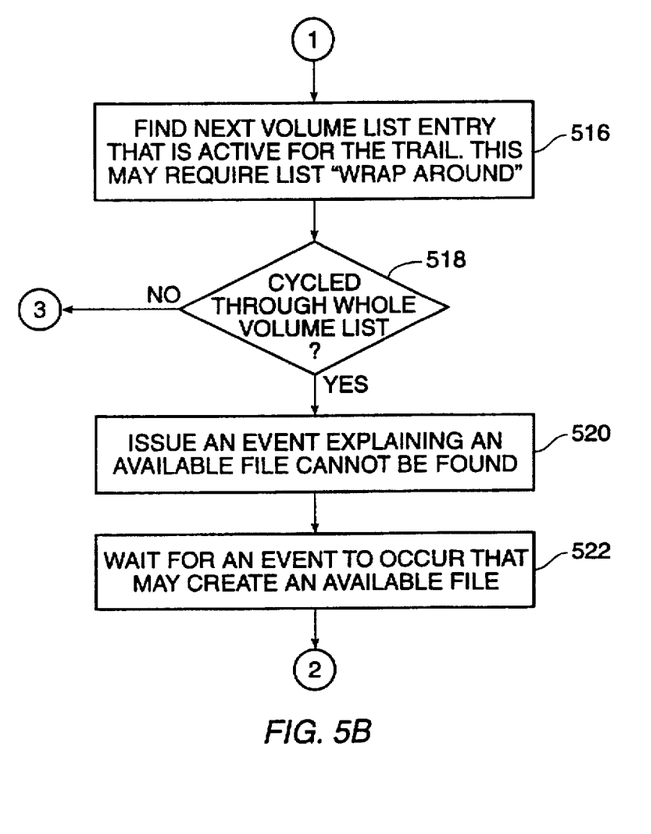

FIGS. 5A and 5B depict a flowchart describing the steps of selecting a next current audit trail file in accordance with the invention. At step 500, the audit trail configuration management process 220 receives a request from the current ADP to prepare the next audit trail file. At step 502, the audit trail configuration management process 220 identifies the current ADP entry in the volume linked list 402. At step 504, the audit trail configuration management process 220 selects the next ADP entry in the volume linked list 402 as a candidate to be the new current ADP. At step 506, the audit trail configuration management process 220 determines whether the volume identified by the candidate ADP entry is up and available.

If that volume is up and available, at step 508 it is determined whether there is a preallocated file identified by an entry in the preallocated file linked list associated with the candidate ADP entry. If a preallocated file linked list for the candidate ADP entry has entries, the file identified by the last entry in the list is selected as the next current audit trail file at step 510 and the candidate ADP is the next current ADP.

The preallocated file linked list is then updated by removing the last entry. The resident file linked list is updated by adding an entry with a file sequence number one higher than the sequence number of the current audit trail file.

If no preallocated file is available, audit trail configuration management process 220 checks, at step 512, to see if there is a rename eligible file among the entries on the resident file linked list of the candidate ADP entry. If this resident file linked list has rename eligible entries, the rename eligible file with the lowest sequence number is identified as the next current audit trail file at step 510. This file is then renamed prior to use. The resident file linked list is updated by removing the former entry identifying the rename eligible audit trail file and appending a new entry to the end of the list with a sequence number one higher than the sequence number of the current audit trail file. This new entry identifies the next current audit trail file.

Referring now to FIG. 5B, if the volume identified by the candidate ADP entry is down or has no preallocated files or renaming eligible files, the audit trail configuration management process 220 identifies the next ADP entry on the volume list 402 as a new candidate ADP entry at step 516.

The search for the next candidate ADP entry may wrap around to the beginning of volume list 402 so that the next candidate ADP entry may be the first one on the list. At step 518, audit trail configuration management process 220 checks to see if it has cycled through all of the volumes on the list in its search for an audit trail file. If it has not, execution proceeds to step 506 to identify a suitable next current audit trail file associated with the newest candidate ADP.

If audit trail configuration management process 220 has cycled through all the ADP entries on the volume list and identified no suitable candidates to be the next audit trail file, an event is issued at step 520. The event issued at step 520 explains via system terminal 126 that an audit trail file cannot be found. Audit trail configuration management process 220 then waits at step 522 for an event that may create an available file. Such events would include the addition of a ADP to the configuration, an ADP on the volume list that had been down becoming available, an increase in the number of files per volume, transfer of audit from a previously ineligible file to overflow, or some other change in eligibility status. After an event that may create an available file, audit trail configuration management process 220 returns to step 502 to resume the search.

Thus, provided that the volumes referred to by the volume list 402 stay operational and full audit trail files become eligible for renaming on a timely basis, storage of audit will rotate through the available volumes in a round-robin fashion. The audit trail is thus distributed over many volumes. Archiving processes do not contend for disk access with storage of currently generated audit. Audit trail capacity available for on-line recovery exceeds the storage capacity of any one disk volume. A further benefit is that failure of a non-current ADP or disk volume will not halt storage of currently generated audit. Thus, the multi-volume audit trail technique of the invention leads to an increase in mean-time-between-failures (MTBF).

At the time they start up, all ADPs associated with a multi-volume audit trail learn the name and sequence number of the current audit trail file. When the current ADP sees that its audit trail file has filled up, it will mark the file as full and then send a rollover request to the ADP that owns the next file in the audit trail's sequence of files. The rollover request contains the name and sequence number of the newly created audit trail file. Both ADPs participating in the rollover will update their data structures to indicate the name and sequence number of the newly current audit trail file. Audit trail configuration management process 220 is informed of the rollover via an asynchronous notification. All other ADPs not participating in the rollover do not learn about the newly current audit trail file, but eventually they will update their data structures when they themselves receive rollover requests. This will happen in due course since audit trail files are allocated among the various ADPs in a round robin fashion.

The following example illustrates how ADPs learn about which file is current. Suppose there are three ADPs ($ADP_1$, $ADP_2$, and $ADP_3$) participating in a multi-volume audit trail. Suppose further that at ADP start up time $ADP_1$ contains the current file named $F_1$ (subscript indicates sequence number). The table below shows each ADP's view of the current audit trail file during a series of rollovers.

| Time | $ADP_1$'s View | $ADP_2$'s View | $ADP_3$'s View |
|---|---|---|---|
| After Startup | $F_1$ on $ADP_1$ | $F_1$ on $ADP_1$ | $F_1$ on $ADP_1$ |
| After First Rollover ($ADP_1$ to $ADP_2$) | $F_2$ on $ADP_2$ | $F_2$ on $ADP_2$ | $F_1$ on $ADP_1$ |
| After Second Rollover ($ADP_2$ to $ADP_3$) | $F_2$ on $ADP_2$ | $F_3$ on $ADP_3$ | $F_3$ on $ADP_3$ |
| After Third Rollover ($ADP_3$ to $ADP_1$) | $F_4$ on $ADP_1$ | $F_3$ on $ADP_3$ | $F_4$ on $ADP_1$ |
| ... | | | |

Figure 6A:
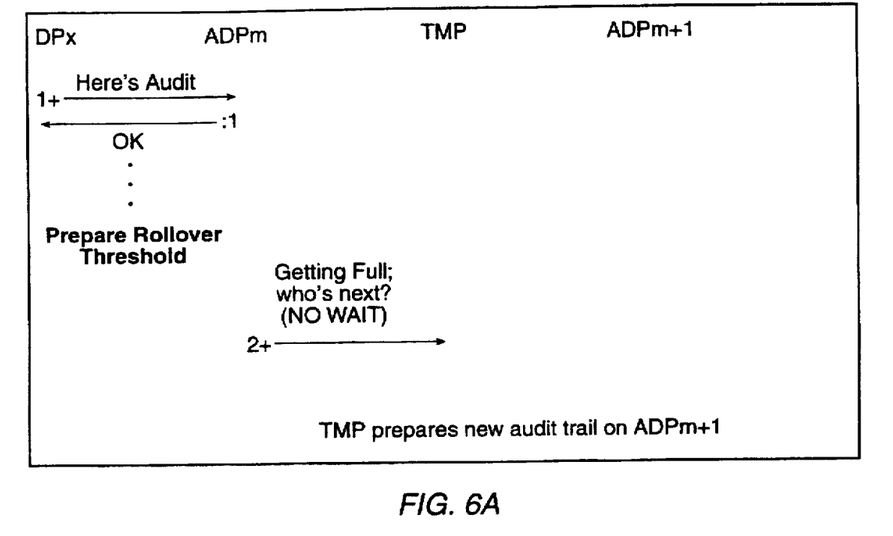
FIGS. 6A-6C depict the messages exchanged among fault tolerant computer system components during operation of a multi-volume audit trail in accordance with the invention.
Figure 6B:
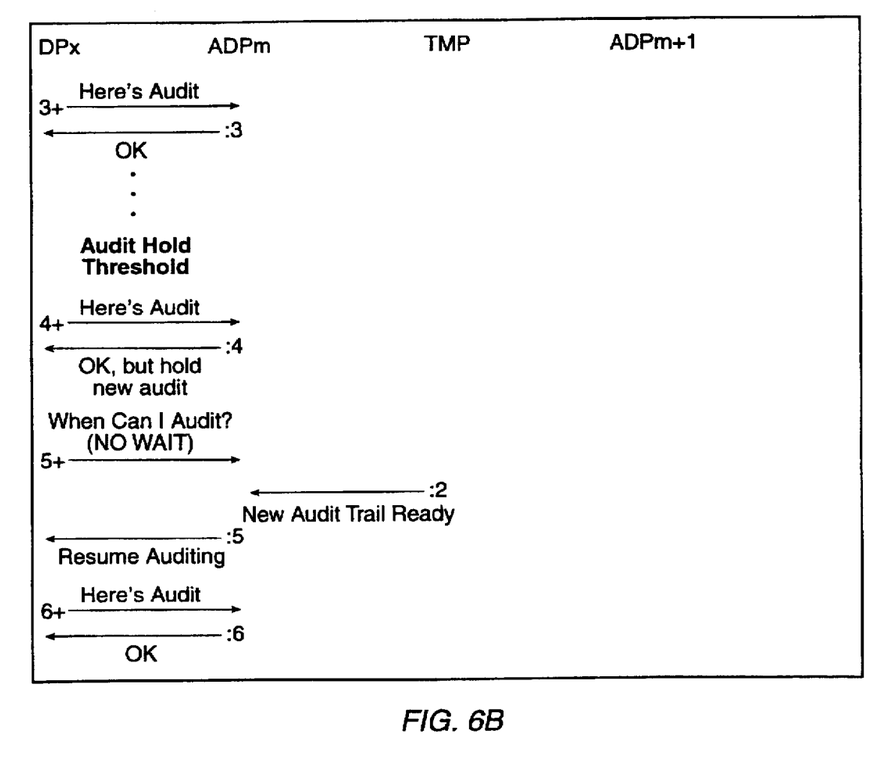
Figure 6C:
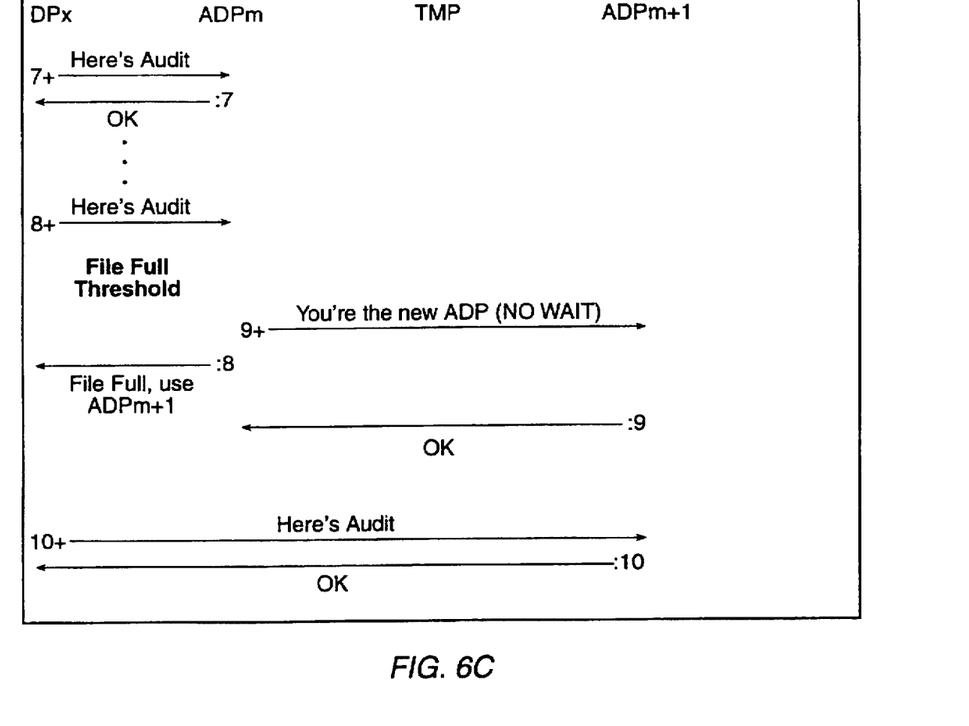

FIGS. 6A through 6C illustrate the messages exchanged by the ADPs, the audit trail configuration management process 220, and an audit generator as the current audit trail file is filled and preparations for a handoff to the next audit trail file are made. The entry labeled $ADP_m$ represents the current ADP. The entry labeled $ADP_{m+1}$ represents the ADP which will begin writing audit after the rollover takes place. $ADP_m$ and $ADP_{m+1}$ are understood to be the primary ADPs unless the backups take over. The entry labeled $DP_x$ represents all audit generating disk processes that currently send their audit to $ADP_m$. The entry labeled TMP represents the audit trail configuration management process 220. Time moves down the page while message system traffic moves back and forth across the page. Arrows at the head of a line segment indicate the direction of the message system traffic. A plus sign (+) at the tail of the line segment marks it as an original message whereas a colon (:) at the tail of a line segment marks it as a reply. Each message has a number to associate it with its corresponding reply. Thresholds appear in italic, bold type. No-wait messages have the keyword NOWAIT in their description. All other messages are assumed to be waited messages.

$ADP_m$ receives buffers of audit records from the audit generator, message 1+, and sends confirmatory replies, message :1. $ADP_m$ stores the buffer of audit records in the current audit trail file. As it stores audit, $ADP_m$ monitors the growth of the current audit trail file. FIG. 6A shows that upon reaching a first threshold, "the prepare rollover threshold", $ADP_m$ sends a message 2+ to the audit trail configuration management process 220, asking it to prepare a new audit trail file. Since the audit trail configuration management process 220 might need system related services from $ADP_m$, the message 2+ is sent no-wait. A waited message could cause a deadlock between the audit trail configuration management process 220 and $ADP_m$.

FIG. 6B shows $ADP_m$ continuing to receive audit from its audit generators, message 3+, but the audit trail configuration management process 220 has not prepared a new audit trail file by the time the current audit trail file reaches a second threshold, "the audit hold threshold". Upon reaching the audit hold threshold, $ADP_m$ will accept the currently sent audit, message 4+, but in the reply, message :4, it will tell its audit generators to hold all their new audit indefinitely. This audit hold threshold is not typically reached since the audit trail configuration management process 220 will normally prepare the new audit trail file and notify $ADP_m$ long before the audit hold threshold is reached. In response to the audit hold reply, the audit generators will send a no wait message 5+ to the current ADP asking it when they can resume sending audit.

The audit trail configuration management process 220 prepares a new audit trail file by renaming an audit trail file accessible to $ADP_{m+1}$ that has been previously been archived or transferred to overflow storage. The new audit trail file is assigned a sequence number one higher than the sequence number of the current audit trail file.

Soon after the audit trail configuration management process 220 prepares a new audit trail file, it notifies $ADP_m$ by sending a reply message :2 to $ADP_m$. The reply message :2 contains the name and sequence number of the new audit trail file. If the current $ADP_m$ has told any audit generators to hold audit, it will notify them, message :5, that they can resume sending their audit. The audit generators will then begin sending their audit to $ADP_m$ once again.

FIG. 6C shows that $ADP_m$ continues to receive audit, messages 7+ and :7, until it gets a request 8+ to write a buffer of audit records that would not fit in the remainder of the current audit trail file. In other words the audit trail file has reached the file full threshold. At this point, $ADP_m$ will write to disk all previously received yet unwritten audit. It will then mark the file as full and send a no-wait rollover message 9+ to $ADP_{m+1}$ telling it to become the new ADP. Finally, it will reply to the audit generator with a file full reply, message :8, indicating the name of $ADP_{m+1}$. Audit will now be directed to $ADP_{m+1}$, messages 10+ and :10. Further details of the rollover are explained with reference to FIG. 7 below.

Other audit generators, so-called "lagging audit generators", will not learn about the rollover until they send audit to $ADP_m$ which will in turn give them file full replies that include the name of $ADP_{m+1}$. These audit generators will then begin sending their audit to $ADP_{m+1}$.

Note that in FIG. 6C that the reply to message 8 occurs before the reply to message 9. The old ADP gives file full replies to its audit generators before it receives a reply to the rollover message from the new ADP. This leads to a possible race condition in which an audit generator correctly sends audit to a new ADP before the new ADP receives the rollover message. Referring to FIG. 6C, this means that message 10+ could theoretically arrive at $ADP_{m+1}$ before message 9+. This situation should only happen in the event of a catastrophic CPU failure.

In the event $ADP_{m+1}$ receives a buffer of audit records before it realizes that it is the current ADP, it will give a file full reply along with the name of the last known current ADP. The audit generator will thus take a cyclic tour of all ADPs on the trail until it returns to the current ADP and the current ADP has received its rollover message.

Such cyclic tours could be avoided altogether if the rollover message 9 were made waited but this would reduce performance in the typical case because the old ADP would have to wait for a reply to the rollover message before it could in turn reply to any of its audit generators.

The calculation of the prepare rollover and audit hold thresholds will now be discussed. To understand the basis for the calculation of these thresholds it is useful to view an audit generator as a collection of multiple cooperating audit-generating processes, herein referred to as pins.

An audit generator may continue to send audit to its current ADP for a short time after the ADP has told the data volume to hold audit. The audit generator does this because at the time the ADP told it to hold audit, some of its pins may been working on behalf of an audit generating request. Also, the audit generator may have already accumulated audit records in its audit buffer at the time the ADP told it to hold audit. Thus, the ADP needs to set the audit hold threshold so that it can successfully accept this extra audit. Setting the audit hold threshold in accordance with the following formula assures that the extra audit will be accepted:

$$AHT=MF-(B*(DV+DVP))$$

where AHT is the audit hold threshold, MF is the maximum size of an audit trail file, B is the size of an audit generator's audit buffer, around 32K in the preferred embodiment, DV is the number of audit generators that send audit to the ADP, and DVP is the total number of pins for those audit generators that send audit to the ADP. Since audit trail configuration management process 220 also sends audit, it should be considered as a single pin audit generator for the formula.

The term $(B*(DV+DVP))$ represents the amount of audit the ADP could (at least theoretically) receive after telling its associated audit generators to hold their audit. Adding the number of audit generators to the number of pins addresses the possibility that each audit generator's buffer is completely full at the time it starts processing its next request and that each pin of the audit generator processes a request that fills the entire buffer with audit records.

The audit hold threshold formula given above is very conservative. It produces a much lower threshold than is typically necessary to guarantee storage of all audit.

In the preferred embodiment, the prepare rollover threshold is set to 70% of the audit hold threshold. This value could also be made configurable or be derived from the actual audit generation rate.

When an ADP starts up, it does not know how many audit generators will send it audit, nor does it know the number of pins on each audit generator. Thus, the ADP must adaptively recalculate the audit hold threshold and prepare rollover threshold each time it learns about a new audit generator. Every time an audit generator sends audit to an ADP, it indicates the number of pins in its process group. The first time an ADP gets audit from a particular audit generator, it will update the number of audit generators and the number of pins (DV and DVP from the above formula) and recalculate the audit hold threshold and prepare rollover threshold.

Each time the ADP recalculates the prepare rollover threshold, it must compare this value with the size of the current audit trail file. If the size of the file exceeds the prepare rollover threshold and if the next file is not yet prepared, the ADP must immediately send a request to the audit trail configuration management process 220 asking it to prepare a new audit trail file.

It is critical that failures of $ADP_m$ or $ADP_{m+1}$ during rollover not cause either a situation where no ADP operates as if it is current, "dropping the baton", or a situation where more than one ADP operates as if it is current, "breaking the baton." The present invention provides a fault tolerant rollover message protocol among the audit generators, $ADP_m$, $ADP_{m+1}$ and their backups.

Figure 7:
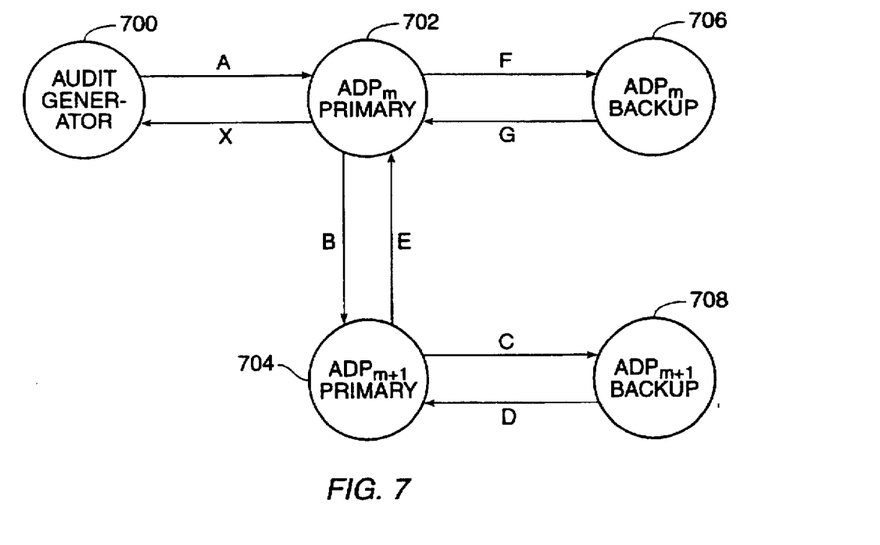
FIG. 7 illustrates a fault tolerant rollover message protocol in accordance with the invention.

FIG. 7 illustrates a fault tolerant rollover message protocol in accordance with the invention. The circles represent processes, an audit generator 700, a primary $ADP_m$ 702, a primary $ADP_{m+1}$ 704, and their backups 706 and 708. The arrows represent messages passing back and forth among the entities. The rollover will occur between primary $ADP_m$ and primary $ADP_{m+1}$.

The current primary ADP, $ADP_m$, receives a buffer of audit records, message A corresponding to message 8+ in FIG. 4C, from the audit generator. As discussed in reference to FIG. 4C, primary $ADP_m$ must mark the current audit trail file as full and send a rollover request, message B or message 9+ in FIG. 4C, to the primary $ADP_{m+1}$. Primary $ADP_{m+1}$ then sends a checkpoint, message C, to backup $ADP_{m+1}$ indicating that it has become the current ADP. Backup $ADP_{m+1}$ returns an acknowledgment, message D. After primary $ADP_{m+1}$ returns an acknowledgment, message E corresponding to message :9 in FIG. 4C, to the original rollover request, primary $ADP_m$ sends a checkpoint, message F, to backup $ADP_m$ indicating that it is no longer the current ADP. When backup $ADP_m$ returns an acknowledgment, message G, the rollover has completed and the protocol terminates.

$ADP_m$ replies to the audit generator, message X corresponding to message :8 in FIG. 4C, telling it that the audit trail file became full and that it must resend the buffer of audit records to the new primary ADP. This reply can take place any time after message B but before message F.

This rollover protocol of the invention involves only six messages (including acknowledgments) between the various ADP processes (including backups). It can be proven that no fault tolerant protocol based on process pairs can use fewer messages.

How this rollover protocol handles failures will now be considered. The rollover protocol must be able to handle failure of a single CPU but not a double CPU failure. Since the primary and backup ADPs run in separate CPUs, at least one will survive a single CPU failure.

Failures: of backup ADPs are not harmful. When a backup ADP's CPU fails it is reloaded. As part of the CPU reload, the backup ADP gets restarted, and the primary sends it a checkpoint message to update all its data structures appropriately so that it is again ready to take over in the event of a failure of the primary. As long as the backup ADP restarts completely before its primary fails, the rollover protocol will succeed.

Furthermore, at several points in the protocol, a loss of a primary ADP clearly will not cause the protocol to fail. For example, if primary $ADP_{m+1}$ fails before primary $ADP_m$ sends message B or after backup $ADP_{m+1}$ has received message C, backup $ADP_{m+1}$ has enough information to successfully take over and become primary. Also, if primary $ADP_m$ fails before it receives message A or after backup $ADP_m$ receives message F, backup $ADP_m$ has enough information to take over and become primary. Finally, if both primary $ADP_m$ and primary $ADP_{m+1}$ fail after primary $ADP_m$ sends message B but before primary $ADP_{m+1}$ sends message C, both backup $ADP_m$ and backup $ADP_{m+1}$ have enough information to take over and become primary. Note that in this case, the audit generator may have to resend message A to backup $ADP_m$ which will have taken over and become primary.

Four failure scenarios remain to be considered:

I) Primary $ADP_m$ fails after it sends message B but before it sends message F.

II) Primary $ADP_{m+1}$ fails after it receives message B but before it sends message C.

III) Primary $ADP_{m+1}$ fails after it sends message C but before it replies with message E.

IV) Both primary $ADP_m$ and primary $ADP_{m+1}$ fail after primary $ADP_{m+1}$ sends message C but before primary $ADP_m$ sends message F.

In case I, since backup $ADP_m$ did not yet receive message F when it takes over, it will still think that it is current. Since primary $ADP_{m+1}$ received message B successfully, it will think that it is current.

Both backup $ADP_m$ and primary $ADP_{m+1}$ believe that they are current. However, they do not both operate as if they are current. Recall that before it ever sent message B, primary $ADP_m$ marked the current audit trail file as full. If backup $ADP_m$ (which will have become primary) receives any new audit, it will recognize that the audit trail file is full and simply reinitiate the rollover. Primary $ADP_{m+1}$ will recognize that the sequence number in the rollover request equals or precedes the sequence number it already believes to be current. Thus, primary $ADP_{m+1}$ will acknowledge the request but otherwise disregard it since it has already begun using an audit trail file with a sequence number greater than or equal to the one specified in the request.

Suppose, however, that backup $ADP_m$ (which will have become primary) does not receive audit that causes it to reinitiate the rollover. Eventually, it will receive a rollover request itself even though it already thinks it is current. Since the sequence number in this rollover request will exceed the sequence number it already believes to be current, it will close its current audit trail file and begin using the audit trail file specified in the rollover request. Thus, eventually the audit trail returns to a state where one and only one ADP thinks it is current.

In case II, primary $ADP_m$ is notified that primary $ADP_{m+1}$ failed, so it will resend the rollover request to backup $ADP_{m+1}$ which will have taken over and become primary. Since backup $ADP_{m+1}$ never received message C, this is the first time it will have learned about the rollover and will proceed with the protocol as in the normal case.

Case III is similar to case II. Primary $ADP_m$ receives notification that primary $ADP_{m+1}$ failed, so it will resend the rollover request to backup $ADP_{m+1}$ which will have taken over and become primary. Since backup $ADP_{m+1}$ received message C, it will have become current. Upon receiving the resent rollover request, backup $ADP_{m+1}$ will recognize that the sequence number in the request equals or precedes the sequence number of the file it already believes to be current. Thus, backup $ADP_{m+1}$ will acknowledge the resent rollover request but otherwise disregard it since it will have already begun using an audit trail file with a sequence number greater than or equal to the one specified in the request.

Case IV is similar to case I. Both backup $ADP_m$ and backup $ADP_{m+1}$ will take over and become primary. Since backup $ADP_{m+1}$ received message C, it will think that it is current. Since backup $ADP_m$ never received message F, it will think it is current. Both ADPs think they are current but the ADPs will eventually rectify the situation. As in case I the ADPs in question rely on the sequence number in the rollover request and on the fact that primary $ADP_m$ will have marked the current audit trail file as full before initiating the rollover.

If backup $ADP_m$ (which will have become primary) receives any new audit, it will recognize that the audit trail file is full and simply reinitiate the rollover. Backup $ADP_{m+1}$ (which will have become primary) will recognize that the sequence number in the rollover request equals or precedes the sequence number it already believes to be current. Thus, backup $ADP_{m+1}$ will acknowledge the request but otherwise disregard it since it has already begun using an audit trail file with a sequence number greater than or equal to the one specified in the request.

If backup $ADP_m$ does not receive audit that causes it to reinitiate the rollover, it will receive a rollover request itself even though it already thinks it is current. Since the sequence number in this rollover request will exceed the sequence number it already believes to be current, it will close its current audit trail file and begin using the audit trail file specified in the rollover request. Once again, the audit trail returns to a state where one and only one ADP operates as the current ADP. Thus the action an ADP that believes it is current will take upon receiving a rollover request will depend on the sequence number.

If an ADP does not believe itself to be current and it receives a rollover request, three scenarios are possible. If the sequence number of the request is greater than the previous sequence number known to the ADP, this is the normal situation and this ADP should become current. If the sequence number of the request is equal to the previous sequence number, then a protocol failure has occurred since this is impossible if all processes follow the above-described rules. The ADP should then fail. If the sequence number in the request is less the known sequence number, the requester is lagging for some reason and the ADP should acknowledge this request and ignore it.

| ADP Status | Sequence Number Status | Action |
| --- | --- | --- |
| This ADP thinks it is not current | Seq. No. in request > Seq. No. known to this ADP | Normal Case. This ADP should become current. |
| | Seq. No. in request = Seq. No. known to this ADP | Protocol Error! Should not happen, so this ADP should fail fast. |
| | Seq. No. in request < Seq. No. known to this ADP | Lagging Requestor. This ADP should acknowledge the request but not process it. |
| This ADP thinks it is current | Seq. No. in request > Seq. No. known to ADP | This ADP is Lagging. It should close the old audit trail file and begin using new file specified in the request. |
| | Sequence number in request <= sequence number known to ADP | Lagging Requestor. This ADP should acknowledge the request but not process it. |

A configured audit trail has a limited capacity. Active audit trail capacity is calculated to be n*m*x, where n is the number of active volumes in the audit trail, m is the number of audit trail files per volume, and x is the capacity of a single audit trail file. This capacity limit becomes important when the rate of audit generation exceeds the rate at which storage space becomes available for storage of new audit, i.e. full audit trail files become eligible for renaming. For example, an operator may be unavailable to mount a tape for an audit dump or there may be a sudden burst of audit generation that causes the audit trail to fill.

The invention permits selected disk volumes to be designated by the system operator for overflow audit trail storage. In operation, overflow storage is used once a configurable threshold percentage of active audit trail capacity is occupied by full audit trail files that are ineligible for renaming. The overflow threshold is typically configured to be anywhere from 50% to 100% of audit trail capacity. The optimal threshold may also be calculated from the audit generation rate and active audit trail capacity. Audit trail records are transferred to the overflow volumes, thus freeing space for new audit generation.

The audit trail configuration management process 220 maintains an overflow audit configuration data structure. This data structure includes an overflow volume linked list having entries for the ADPs responsible for the overflow volumes.

Figure 8:
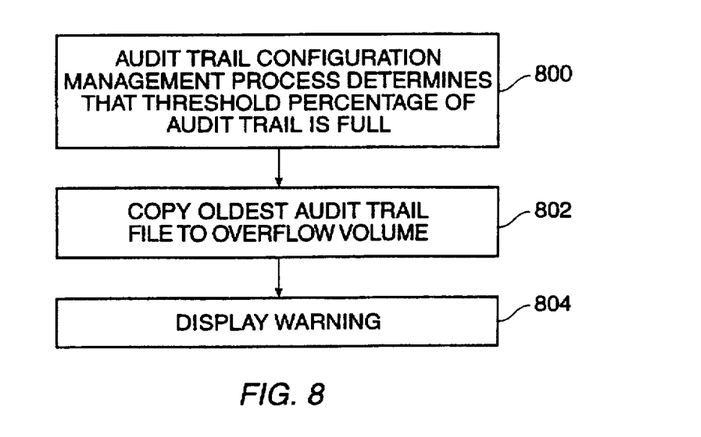
FIG. 8 illustrates the steps of using overflow audit trail storage in accordance with the invention.

FIG. 8 illustrates the steps of using overflow audit trail storage in accordance with the invention. At step 800, the audit trail configuration management process 220 determines that more than the threshold percentage of the audit trail is full. At step 802, the oldest audit trail file (lowest sequence number) which is not yet eligible for renaming is copied to one of the volumes configured for that purpose and then marked as rename eligible. Audit trail configuration management process 220 selects the target overflow volume by cycling through the overflow volume linked list until it finds an ADP entry with room on its disk storage unit. If for some reason overflow and regular audit trail storage share the same disk volume and an active audit trail file on the disk volume is to be copied to overflow space on the same disk volume, the file is simply renamed as overflow and a new preallocated audit trail file is created in the overflow space of the disk volume.

At step 804, the system terminal 126 displays a warning that something must be done to eliminate the use of the overflow space. The appropriate action depends on the reason that audit trail files are not rename eligible. If audit has not been dumped, the operator should mount a tape. If a pending transaction is preventing files from being renamed, the transaction should be terminated. If the CPU running the audit generator requires audit for cache recovery, the operator should wait for a periodic flushing of the cache. If another process such as remote backup is denying rename eligibility to many audit trail files, the process should be examined or queried. Also, if storage space is available, the operator may increase the number of files per volume or add volumes to the audit trail. Once overflow audit stored in a file is no longer needed because the audit stored there has been archived, the overflow file is purged.

If the audit trail continues to fill despite the use of overflow space, a second threshold, the begin transaction disable threshold may be reached. At this threshold, the audit trail configuration management process 220 disallows new transactions. The threshold should be configured so that enough audit trail capacity remains to accommodate audit resulting from pending transactions. When audit trail capacity becomes available so that the begin transaction disable threshold is no longer exceeded, audit trail configuration management process 220 again allows new transactions.

The system manager can also specify a set of disk volumes that will hold audit trail files restored from an audit dump as part of a recovery procedure. Audit trail configuration management process 220 maintains another volume linked list including entries for the ADPs designated to receive restored audit trail files. As with overflow, audit trail configuration management process 220 cycles through this volume linked list to find the next ADP with space to receive restored audit.

The invention provides the ability to reconfigure an audit trail without restarting the fault tolerant computer system 200. Volumes may be added to, or deleted from, the sets of volumes used to hold the active audit trail, its overflow space, and its restored files. The number of active files per volume, overflow threshold, and begin transaction disable threshold may also be modified.

When a new active volume is added to an audit trail, extra files are allocated on that volume, thus adding capacity to the active audit trail. Deleting an active volume from an audit trail has the net effect of reducing the number of active audit trail files.

When an active volume is deleted, its entry is marked on the volume linked list so that it is no longer used to hold new audit trail files. However, any files which already exist on the volume will remain until they are no longer needed. Once all of the files on a volume are no longer needed, the volume is removed from its previous role in the configuration. This implies that a deleted volume is in a transitional "deleting" state while it still contains audit trail files. When a previously deleted volume is restored to active status, it is so-marked and again becomes available for holding new audit files and retains its position within the linked list.

Figure 9:
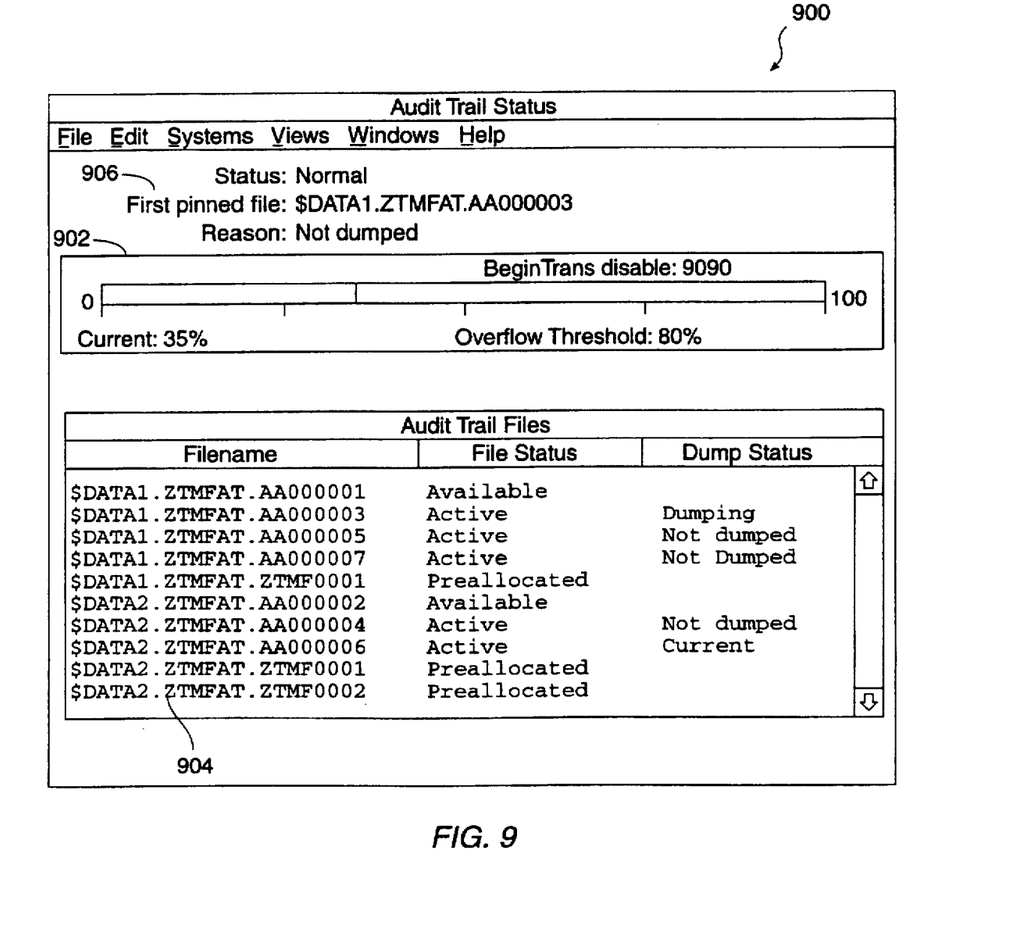
FIG. 9 depicts an audit trail status display in accordance with the invention.

FIG. 9 depicts an audit trail status display 900 in accordance with the invention. Status display 900 includes an audit trail consumption bar graph 902 and an audit trail file status chart 904 and a status information area 906. Audit trail consumption bar graph 902 indicates the percentage of audit trail capacity consumed by audit trail files that are ineligible for renaming. The overflow threshold and begin transaction disable threshold are clearly marked on bar graph 902. Thus, the system operator is provided with an easily understood indication of current audit trail operation.

Audit trail file status chart 904 lists the names of audit trail files, their file status and their dump status. The file status indicates whether the file is available, i.e. eligible for renaming, active (ineligible for renaming), or preallocated. The dumping status is indicated only for active files. The possible dumping statuses include "Dumped", "Not Dumped", "Current" and "Not Dumping". The status "Not Dumping" indicates that the system was configured to not dump audit when that file was written to.

Status area 906 includes an indication, whether the current audit trail status is "Normal", or "Overflow In Use." Also, here the system operator can see the name of the "First pinned file", the oldest file that is ineligible for renaming. There is also a brief explanation of why that file is ineligible for renaming. The depicted display indicates that the oldest ineligible file is ineligible because it is the current audit trail file.

While the above is a complete description of the preferred embodiments of the invention, various alternatives, modifications and equivalents may be used. It should be evident that the present invention is equally applicable by making appropriate modifications to the embodiments described above. For example, the audit trail techniques described above could be applied to the storage of any continuously generated records that are appended in a sequential manner. Therefore, the above description should not be taken as limiting the scope of the invention which is defined by the metes and bounds of the appended claims.

What is claimed is:

1. A fault tolerant computing system comprising:

an audit generator that generates audit records, each audit record describing a change to a database accessed by said audit generator;

a plurality of audit trail storage units coupled to said audit generator that store said audit records in audit files;

a plurality of audit trail storage processes that receive audit records from said audit generator and directs said audit records to said audit trail storage units, each audit trail storage process having access to at least one audit trail storage unit, audit records being directed from said audit generator through a currently responsible audit trail storage process to a currently assigned audit file on an audit trail storage unit; and an audit trail configuration process coupled to said plurality of audit trail storage processes that selects a audit file to be the currently assigned audit file and a next audit trail storage process to be the currently responsible audit trail storage process when a previously assigned audit file becomes full, the next audit file being located on a different audit trail storage unit than the currently assigned audit file, the next audit trail storage process receiving a message from the currently responsible audit trail storage process to initiate a handoff of responsibility.

2. The fault tolerant computing system of claim 1 wherein said previously assigned audit file is archived while audit records are stored in said next audit file.

3. In a fault tolerant computing system having an audit generator, first and second audit trail storage processes, wherein said audit trail storage processes store audit records generated by said audit generator in audit files accessible to said audit storage processes, a method for switching storage of currently generated audit records from said first audit trail storage process to said second audit trail storage process, said method comprising the steps of:

receiving, at said first audit trail storage process, a buffer of audit records from said audit generator for storage in a first audit file accessible to said first audit trail storage process;

determining, at said first audit trail storage process, upon receipt of said buffer of audit records, that said first audit file is full and cannot accept said buffer of audit records; and thereafter sending a request message from said first audit trail storage process to said second audit trail storage process, said request message including a unique sequence number identifying a second audit file accessible to said second audit trail storage process.

4. The method of claim 3 further comprising the step of:

sending an acknowledgement message from said second audit trail storage process to said first audit trail storage process in response to said request message.

5. In a fault tolerant computing system having an audit generator, first and second audit trail storage processes, wherein said audit trail storage processes store audit records generated by said audit generator in audit files accessible to said audit storage processes, apparatus for switching storage of currently generated audit records from said first audit trail storage process to said second audit trail storage process, said apparatus comprising:

means for receiving, at said first audit trail storage process, a buffer of audit records from said audit generator for storage in a first audit file accessible to said first audit trail storage process;

mean for determining, at said first audit trail storage process, upon receipt of said buffer of audit records, that said first audit file is full and cannot accept said buffer of audit records; and means for sending a request message from said first audit trail storage process to said second audit trail storage process, said request message including a unique sequence number identifying a second audit file accessible to said second audit trail storage process.

6. The apparatus of claim 5 further comprising:

means for sending an acknowledgement message from said second audit trail storage process to said first audit trail storage process in response to said request message.

* * * * *